United States Patent
Parlin et al.

(10) Patent No.: US 7,469,257 B2
(45) Date of Patent: Dec. 23, 2008

(54) GENERATING AND MONITORING A MULTIMEDIA DATABASE

(75) Inventors: David R. Parlin, Redmond, WA (US); Mark A. Nikiel, Redmond, WA (US); Samuel T. Williams, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/220,705

(22) Filed: Sep. 8, 2005

(65) Prior Publication Data

US 2007/0055697 A1 Mar. 8, 2007

(51) Int. Cl.
*G06F 17/30* (2006.01)
(52) U.S. Cl. .................. 707/102; 707/104.1
(58) Field of Classification Search .......... 707/2, 707/3, 5, 100, 101, 102, 104.1, 103 R; 715/230, 715/234
See application file for complete search history.

(56) References Cited

U.S. PATENT DOCUMENTS

| | | | |
|---|---|---|---|
| 6,269,382 B1 * | 7/2001 | Cabrera et al. | 707/204 |
| 6,314,439 B1 * | 11/2001 | Bates et al. | 715/209 |
| 6,606,660 B1 * | 8/2003 | Bowman-Amuah | 709/227 |
| 7,127,471 B1 * | 10/2006 | Wilson | 707/103 R |
| 7,197,258 B2 * | 3/2007 | Ahn et al. | 399/103 |
| 2002/0069218 A1 * | 6/2002 | Sull et al. | 707/501.1 |
| 2003/0193994 A1 * | 10/2003 | Stickler | 375/150 |
| 2007/0033292 A1 * | 2/2007 | Sull et al. | 709/238 |
| 2007/0033521 A1 * | 2/2007 | Sull et al. | 715/523 |

* cited by examiner

*Primary Examiner*—Diane Mizrahi
(74) *Attorney, Agent, or Firm*—Shook, Hardy & Bacon LLP

(57) ABSTRACT

A computer readable medium and method to generate a multimedia database that represents a collection of files having different file extensions is provided. The method includes receiving the collection of files from a file system, extracting and storing metadata in multimedia objects stored in the multimedia database. The metadata includes fast and slow metadata associated with the collection of files, which are extracted from the collection of files. Policies associated with the file extensions are applied to the collection of files to determine the fast metadata that should be extracted before the slow metadata. The multimedia objects are created to store the fast metadata and references to the collection of files. After extracting the fast metadata from the collection of files, the slow metadata is extracted and stored in the multimedia objects.

19 Claims, 6 Drawing Sheets

GENERATING AND MONITORING A MULTIMEDIA DATABASE

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Currently users assign metadata to images, where the metadata represents keywords that are associated with the images. The metadata is utilized to organize the images or to retrieve the images based on search requests initiated by the users.

For instance, a user that creates one or more images may assign a name that provides a limited description for the image. The image is stored in a folder having other images with similar characteristics, such as, histograms, colors, similarity vectors, etc. Also, the image is associated with a caption that further defines the image. The caption may include information that can be utilized to retrieve the image. A user that attempts to find the image within a large collection of images may initiate a search of the large collection by navigating a folder hierarchy and traversing each image in each folder to locate the image, or the user may utilize an image search that queries the image characteristics that the user believes is associated with the image. The large collection of images is not stored to enable fast retrieval of the images based on metadata associated with the image, and the search response provides result sets that are based on image characteristics that are difficult to calculate.

SUMMARY

A multimedia database provides objects that efficiently store multimedia files and metadata that enable the multimedia database to dynamically and efficiently respond to user queries. The objects are optimized to respond to queries and include label objects and word objects that provide references to labels and multimedia files associated with the objects. The user queries utilize the label and word objects to implement queries that generate dynamic results. Additionally, the multimedia database monitors the multimedia files and updates the multimedia metadata associated with the multimedia files when changes occur to the multimedia metadata. Accordingly, the multimedia database provides quick and dynamic results utilizing up-to-date multimedia metadata associated with the multimedia files.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the invention monitor an information space having multimedia files and extract multimedia metadata associated with the multimedia files to generate a multimedia database. The multimedia metadata is collected and stored in label objects and word objects that provide dynamic access to the multimedia files associated with the multimedia metadata. A user may initiate a search utilizing the word and label objects to retrieve the multimedia files that match user queries. The word and label objects efficiently organize the multimedia metadata to allow the search to quickly respond the user queries. Accordingly, embodiments of the invention generate a multimedia database and provide a graphical user interface to access the multimedia files stored in the multimedia database.

A computing environment utilized to implement embodiments of the invention may include a collection of client and server computers. The client and server computers may include multi-processor computers and portable computers. The portable computers may include laptops, personal digital assistants, smart phones, etc. The client or server computers may include databases that store data and provide interfaces to access the data. The server computers are computers that are accessed over a communication network and may include search engines that provide access to the databases stored on the server computers.

In an embodiment of the invention, multimedia files may include images, audio and video files, video clips, and photo lists. The client or server computers may store a multimedia database that is optimized to store and access the multimedia files. The multimedia database may be implemented as a relational database or an object oriented database.

Figure 1:
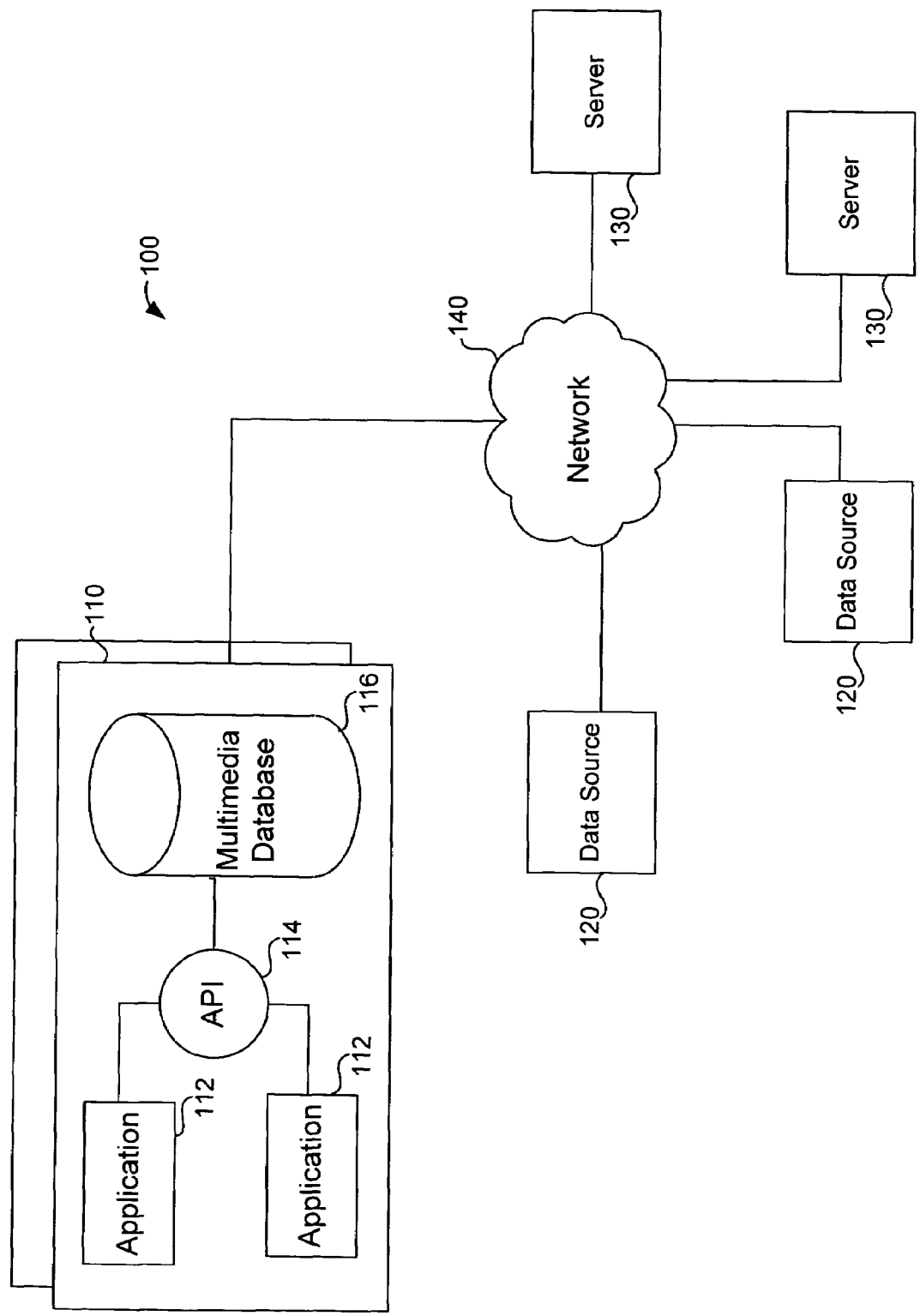
FIG. 1 illustrates a block diagram of an exemplary computing environment utilized by embodiments of the invention.

FIG. 1 illustrates a block diagram of an exemplary computing environment 100 utilized by embodiments of the invention. The computing environment 100 is not intended to suggest any limitation as to scope or functionality. Embodiments of the invention are operable with numerous other special purpose computing environments or configurations. With reference to FIG. 1, the computing environment 100 includes client computers 10, server computers 130, data sources 120 and a communication network 140.

The client and server computers 110 and 130 each have processing units, coupled to a variety of input devices and computer-readable media via communication buses. The computer-readable media may include computer storage and communication media that are removable or non-removable and volatile or non-volatile. By way of example, and not limitation, computer storage media includes electronic storage devices, optical storages devices, magnetic storage devices, or any medium used to store information that can be accessed by client computers 110, and communication media may include wired and wireless media. The input devices may include, mice, keyboards, joysticks, controllers, microphones, cameras, or camcorders, picture phones, or any suitable device for providing user input to the client computers 110.

Additionally, the client computers 110 may store application programs 112 that provide computer-readable instructions to implement various heuristics. In an embodiment of the invention, the client computers 110 store a multimedia database 116 that provides multimedia metadata and references to multimedia files stored in a file system on the client computers 110. The multimedia database 116 communicates with the application programs 112 via an application programming interface (API) 114. The API 114 receives application requests and accesses the multimedia database 116 to generate responses to the application requests. The application requests may include user requests for multimedia files having multimedia metadata that matches a string in the application requests.

The client computers 110 communicate with data sources 120 and server computers 130 over the communication network 140. The communication network 140 may be a local area network, a wide area network, or the Internet. The data sources 120 may include websites or image capture devices that gather or create multimedia files, such as, for example, photographs. The information collected by the data sources 120 is retrieved by client computers 110 to update the multimedia database 116. In an alternate embodiment of the invention, the server computers 130 may store a multimedia database, receive application requests from the client computer 110 and generate results based on the application requests. The computing environment illustrated in FIG. 1 is exemplary and other configurations are within the scope of the invention.

The multimedia database may be a relational database having records and fields in multiple tables that are related via various keys. Here, the multimedia database would be field delimited and include various records or rows for each multimedia file. Alternatively, the multimedia database may be implemented as an object oriented database. Each multimedia file would be an object having properties that represent the fields. Moreover, the object oriented implementation provides faster processing and increased scalability and other benefits associated with object oriented programming, such as inheritance. Accordingly, the multimedia database may be implemented as an object database, a relational database or any database model capable of representing discrete values.

In an object oriented database, a multimedia object defines a generic object that is utilized to represent the multimedia files. The multimedia object includes attributes that are utilized to define the multimedia files. Each multimedia file stored in the multimedia database provides multimedia metadata that specifies values for the attributes of the multimedia object. Also, each multimedia file is represented by a unique multimedia object that references the multimedia file and stores the multimedia metadata associated with the multimedia file in the attributes of the multimedia object. Accordingly, each photograph, video, etc, is represented by a unique multimedia object having attributes that store the multimedia metadata.

In addition to the multimedia object, specialized objects are utilized to optimize the storage of the multimedia metadata. A metadata object, such as, a label object provides a centralized location to store and access metadata that is shared across a large collection of multimedia files. The label object provides quick access to the collection of multimedia objects having similar multimedia metadata. Moreover, an index object such as, a word object provides an object for each unique word within the multimedia metadata associated with the multimedia and label objects. The word object provides a collection of objects that represent different words. Relationship objects, such as, label and word association objects provide references that map the word and label object to one or more multimedia objects.

Figure 2:
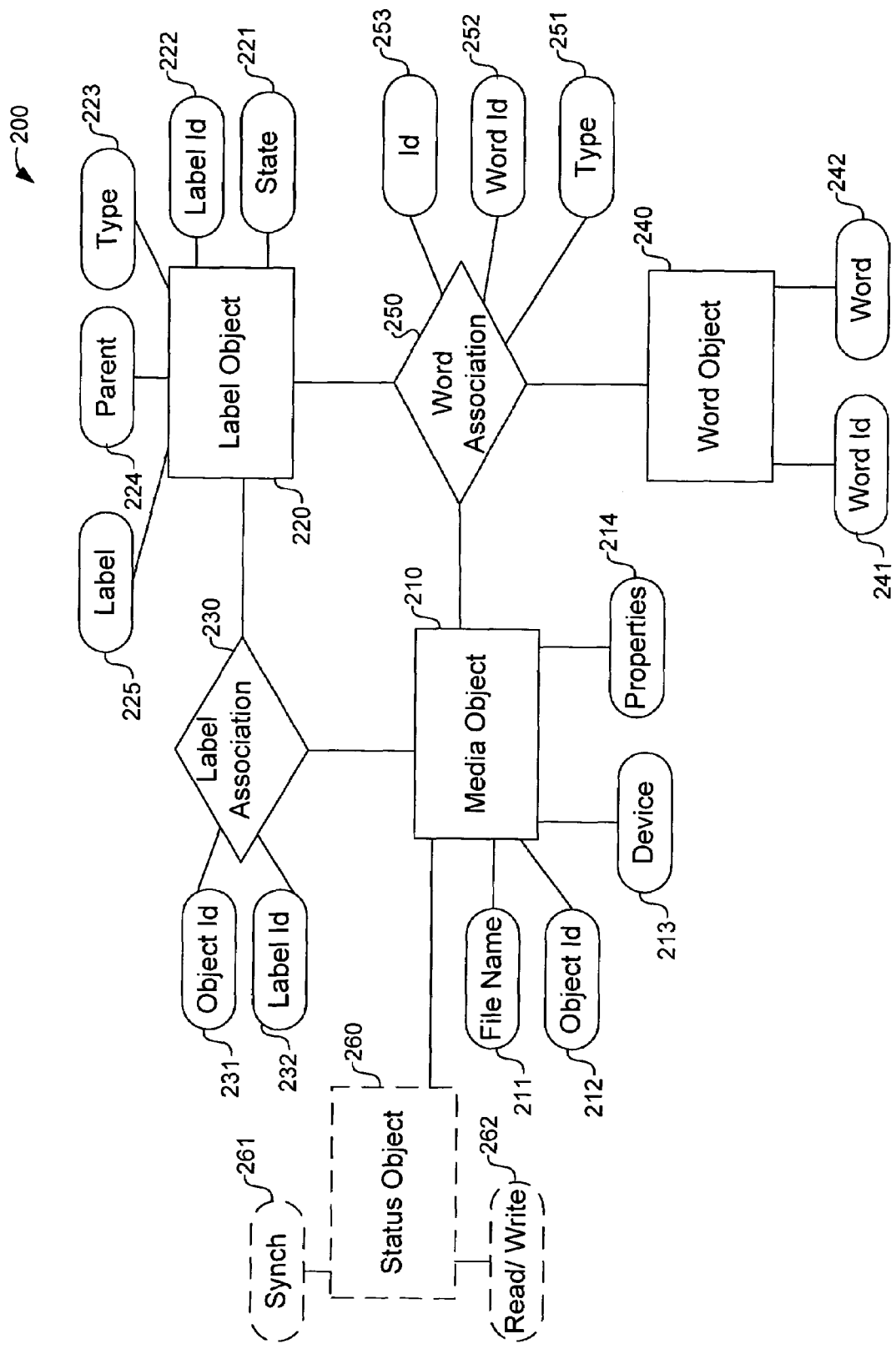
FIG. 2 illustrates an entity-relationship diagram representing objects utilized by a multimedia database.

FIG. 2 illustrates an entity-relationship diagram 200 representing objects utilized by the multimedia database. Here, the multimedia database utilizes a multimedia object 210 to store multimedia metadata and references to multimedia files. The multimedia object 210 stores multimedia metadata that defines the multimedia files. The multimedia object 210 may include attributes that define an image, a video or audio file, an image capture device, or a user. The attributes may represent metadata such as, file name, date taken, file size, camera model, etc. For example, the multimedia object 210 may include a file name attribute 211, an object identifier attribute 212, a device attribute 213, and a properties attribute 214. The file name attribute 211 stores the name of the multimedia file. The object identifier attribute 212 provides identification for each unique multimedia object 210. The device attribute 213 stores information utilized to describe the image capture device, the information may include film speed, shutter speed, etc. The properties attribute 214 stores information about the characteristics of the multimedia file, the characteristic may include color, resolution, file size, etc. The attributes 211-214 are utilized by the multimedia database to store multimedia metadata that describes the multimedia files and devices that generate the multimedia files.

In an embodiment of the invention, the multimedia object 210 stores multimedia metadata that provides status information about whether the multimedia object 210 is being accessed by a process and a type associated with the process accessing the multimedia object 210.

A label object 220 references the multimedia object 210 through a label association object 230 to access the multimedia files. The label object 220 provides access to multimedia metadata that is static and shared across a large set of the multimedia files. The label object 220 represents common values, such as, folder, dates, film speed, rating, albums, etc., shared between multimedia objects 210 in a hierarchy. The label object 220 utilizes the one or more attributes to store the common values for the multimedia metadata shared across a subset of the multimedia files. For example, each label object 220 may include a status attribute 221, a label identifier attribute 223, a type attribute 223, a parent identifier attribute and a label attribute 225. The status attribute 221 may include data that tracks whether a natural language word breaker is processing the label object 220 to generate word objects 240. The label identifier 222 provides an identifier for each unique label stored in the multimedia database. The type attribute 223 stores information about the type of the label object 220. The type attribute includes types, such as, person, location, event, keyword, rating folder, date, file type, etc. The parent identifier 224 stores information to represent hierarchies that include parent relationships in the label object 220. For instance, a family label object may be the parent of child label objects mom and dad. The parent identifier for the mom and dad label objects would include the label identifier associated with the family label object. Furthermore, in an embodiment of the invention, parent relationships may include cross-type relationships. For instance, an email address label object representing a location type may be associated with a person label object representing a person type, by storing the label identifier associated with the person label object in the parent attribute associated with the email address label object. The label attribute 225 stores string information that describes the label object, the string information may include the text for a keyword, an alphanumeric representation of a date, event name, or any multimedia metadata extracted from the multimedia files and shared across a large set of the multimedia files.

Accordingly, the label object 220 provides an optimization for different types of information that may be being grouped or clustered based on shared values. For instance, a rating label object having child nodes one through five may be indexed utilizing each node, where the multimedia objects 210 stored in the multimedia database are associated with each node. The node representing a rating of three would contain references to all multimedia objects 210 having a rating of three associated with the multimedia file. The label object 220 provides retrieval optimizations when a user performs a query over multimedia metadata associated with the label object 220.

The label association object 230 represents relationships between the label objects 220 and the multimedia objects 210. In an embodiment of the invention, the relationships between the label objects 220 and the multimedia objects 210 may be represented as a many-to-many relationship. The label association objects 230 include attributes that provide mappings between a label object 220 and a multimedia object 210 to represent the dynamics of the relationship. For example, each label association object 230 provides an object identifier attribute 231 and label identifier attribute 232. The object identifier attribute 231 stores information that represents the object identifier 212 associated with the multimedia object 210. The label identifier attribute 232 stores information that represents the label identifier 222 associated with the label object 220. Accordingly, the label association object 230 maps the label object 220 to the multimedia object 210 and vice versa.

The word objects 240 are generated by a natural language process that breaks strings into words. The natural language word breaker extracts the multimedia metadata from the multimedia objects 210 and label objects 220 and determines unique words contained in the multimedia metadata to generate a word object 240 for each unique word. The word objects 240 contain attributes to store information that describes each unique word. For example, each word object 240 includes, a word identifier attribute 241, and a word attribute 244. The word identifier attribute 241 stores identification information to identify each word object 240. The word attribute 242 stores information about the unique words extracted from the multimedia metadata. Accordingly, the word objects 240 provide an index that can be utilized to quickly reference all the word identifiers referencing words having a certain letter sequence or prefix. The word object 240 enables a user to run a query on the multimedia metadata associated with the multimedia file. In an embodiment of the invention, the query is a prefix query that issues queries on one or more characters of a string being entered in an input field by a user.

A word association object 250 represents relationships between the word objects 240 and the multimedia objects 210. Additionally, the word association objects 250 represent relationships between the word object 240 and the label objects 220. In an embodiment of the invention, the relationships between the multimedia, label and word objects 210, 220, and 240 may be represented as many-to-many relationships. The word association objects 250 represent the dynamics of the relationships with attributes that provide mappings between a word object 240 and a multimedia object 210 or between a word object 240 and a label object 220. Each word association object 250 includes a type attribute 251, a word identifier attribute 252, and an identifier attribute 253. The type attribute 251 defines whether the identifier attribute 253 references a multimedia object 210 or a label object 220. The word identifier attribute 252 stores information that represents the word identifier attribute 241 associated with the word object 240. The identifier attribute 253 stores information that represents a label identifier 222 associated with the label object 220 or an object identifier 212 associated with the multimedia object 210. Accordingly, the word association object 250 provides access to both the label object 220 and the multimedia object 210. The word and word association objects 240 and 250 provide information that the query can utilize to quickly access the multimedia metadata associated with the multimedia file.

In an embodiment of the invention, an optional status object 260 tracks all reads and writes that are performed utilizing the multimedia, label, label association, word, or word association objects 210, 220, 230, 240 and 250. The status object 260 provides information about whether a read or write is currently pending. The status object 260 includes attributes that specify which directories are monitored and provide information on when the objects 210, 220, 230, 240 or 250 should be updated in response to a change in the multimedia file. For example, the status object 260 includes a synch attribute 261 and a read/write attribute 262. The synch attribute stores information about whether the multimedia object 210 and the multimedia files are synchronized, and the read/write attribute stores status information for the objects 210, 220, 230, 240 or 250 that are currently being accessed by a multimedia database process.

The object oriented database provides a schema that efficiently organizes the multimedia files and provides relationship objects that are searched to receive a result set that includes multimedia files having prefixes that match a search. The multimedia files a monitored to dynamically update the result set, when a change occurs in the multimedia metadata related to the multimedia files. In an embodiment of the invention, each unique word references a set a multimedia and label objects that contain the word and the set is returned in response to a query having a certain number of matching characters. The multimedia database returns the list of multimedia objects that contain text that begin with a sequence of letters. The user is able to quickly find multimedia files based on text metadata across many different metadata types such as, title, description, file name, labels, folders, etc. The label, word, label association, and word association objects provide word mappings in the multimedia database; so text strings will not have to be repeatedly broken for each user query, thereby improving query response time. In an embodiment of the invention, the label and multimedia objects have attributes that represent separate and distinct multimedia metadata attributes.

The multimedia database contains a background thread that monitors the file system to process multimedia files that are imported to, created in, or modified in the computing environment. The thread accesses the multimedia files and prioritizes the multimedia metadata before extracting the multimedia metadata from the multimedia file. The thread divides the multimedia metadata into fast and slow multimedia metadata, and the fast multimedia metadata is extracted before the slow multimedia metadata. The fast multimedia metadata includes information that can be easily determined, such as file name, creation date, etc. Generating the fast metadata does not require processor-intensive operations, such as face detection, spatial relations, thumbnail generation, etc. The thread may utilize different policies to determine which multimedia metadata is the fast multimedia metadata based on the type of multimedia file. After prioritizing and extracting the multimedia metadata, the multimedia objects are populated with the multimedia metadata and the word and label objects are populated. In an embodiment of the invention, the thread includes a fast metadata thread and a slow metadata thread. The fast metadata thread implements the policies, which define criteria that can be utilized to determine the multimedia metadata that must be included in the multimedia object as fast multimedia metadata. For instance, the criteria may specify the multimedia metadata to extract and the locations for extracting the multimedia metadata for predetermined file types. The locations for extracting the fast multimedia metadata may include one or more databases or the file system. The file system may provide the fast metadata thread with multimedia metadata, such as, file name, file size, file type, etc. The databases may provide the fast metadata thread with multimedia metadata such as, title, ratings, date taken, camera model, etc. The slow metadata thread requires the multimedia file to be processed utilizing one or more mathematical models before extracting the slow multimedia metadata. The slow metadata thread implements policies that define the criteria for determining the multimedia metadata that requires extensive processing. For instance, the criteria may specify that any multimedia metadata that requires the file to opened or read, and processed should be implemented by the slow metadata thread. Here, the fast multimedia metadata is extracted by the fast metadata thread and includes multimedia metadata that can be determined from the file system or one or more databases. On the other hand, the slow multimedia metadata requires intensive processing of the multimedia files prior to extracting the slow multimedia metadata, such as, thumbnails or spatial relations, associated with the multimedia files. Additionally, the fast metadata thread is given priority over the slow metadata thread. Accordingly, embodiments of the invention populate a multimedia database based on multimedia metadata extracted from the multimedia files.

Figure 3:
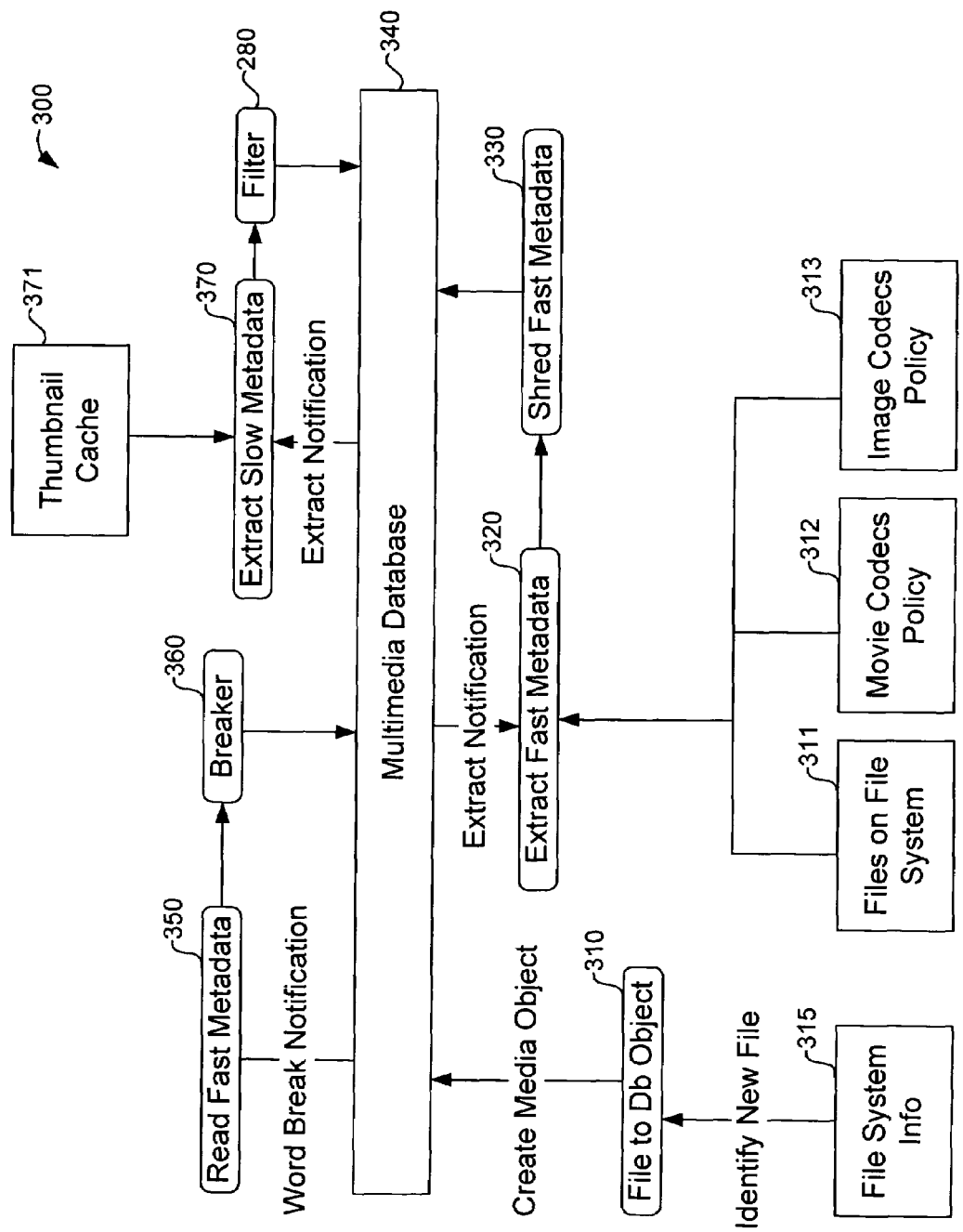
FIG. 3 illustrates a data flow diagram for processing multimedia metadata to generate the multimedia database according to embodiments of the invention.

FIG. 3 illustrates a data flow diagram for processing the multimedia metadata to generate the multimedia database according to embodiments of the invention. The multimedia database 340 monitors the file system 315 to extract metadata based on the file extensions of the multimedia files. A multimedia object 310 is created for each multimedia file in the file system 315 that matches the file extensions. In an embodiment of the invention, the file extensions may include ".gif," ".jpg," ".tiff," ".avi, " ".mov," or any suitable extension that represents multimedia files. The multimedia object 310 is created and includes file system metadata such as for example, file size, creation date, etc. Each multimedia object 310 that is created is flagged for further processing. The multimedia database 340 generates a notification to inform one or more threads that a set of multimedia objects are ready for the next level of processing, extracting fast metadata 320. When extracting fast multimedia metadata, the multimedia database 340 receives multimedia metadata that includes, among other things, information on an image capture device that encoded the multimedia file. The fast multimedia metadata may include shutter speed, date taken, film speed, or user-defined metadata, such as title, description or author. The user-defined multimedia metadata may include hierarchical multimedia metadata that defines parent and child nodes. An image codec policy 313 and movie codec policy 312 contains rules that define the multimedia file encoding and access protocols for the multimedia metadata in the multimedia file. The multimedia database 340 utilizes the policies 312-313 to prioritize and extract the fast metadata.

In addition to extracting the fast multimedia metadata, one or more threads shred the fast multimedia metadata 330. Shredding the fast multimedia metadata creates label objects and further populates the multimedia objects. The shredding of the fast multimedia metadata determines which of the fast multimedia metadata is static over a large set of multimedia objects. The shredder creates a label object and label association object for a pre-specified set of the fast multimedia metadata. For instance, the rating metadata is associated with a subset of the multimedia files and a rating label is created to store the values associated with the multimedia files having the rating metadata. When accessing hierarchical multimedia metadata the shredder creates label objects that include hierarchical relationships. For instance, a digital camera may associate metadata with photographs created by the user with multimedia metadata such as, "family/mom" and "family/dad" that represent labels for photographs that contain images of a dad and mom. When the multimedia database accesses the multimedia metadata associated with the photographs of the mom and dad, a family node with children node mom and dad are created to store the multimedia metadata.

The multimedia database 340 includes a set of label types that represent fast multimedia metadata that is static over a large set of multimedia files. The label objects include a pre-specified set of labels that represent the static and fast multimedia metadata. In an embodiment of the invention, the multimedia database 340 may dynamically expand this set of labels based on data retrieved from the shredder and the collection of multimedia file stored in the multimedia database 340. The label objects and multimedia objects are flagged for further processing and the multimedia database 340 issues a word break notification, after shredding is completed.

The word break notification triggers one or more threads to read fast multimedia metadata 350 from the label and multimedia objects and to break the multimedia metadata having strings into words. The word breaking is implemented by a natural language word breaker 360 that takes strings and outputs unique words. The unique words generate word and word association objects that store the words and references to the label and multimedia objects that contain the words. The multimedia metadata stored in the label and multimedia objects are processed to determine the words contained in the strings within the multimedia metadata stored in the attributes of the label and multimedia objects. In an embodiment of the invention, the natural word breaking process and extracting slow multimedia metadata may occur simultaneously. The slow multimedia metadata associated with each multimedia file is extracted from the multimedia files after the fast multimedia metadata is stored in the corresponding multimedia object. The slow multimedia metadata is also stored in the multimedia object after the necessary processor-intensive calculations are performed to determine face count detection, histograms and spatial relations values that are stored as the slow metadata.

A user may perform a search on the multimedia database 340 to generate a dynamic result set that includes multimedia files have multimedia metadata that corresponds to the query. The result set generated by the multimedia database 340 is dynamically modified as the user enters more characters into the query input field. Moreover, the user may perform a query on the multimedia database 340 while the slow metadata, processor intensive metadata, such as spatial relations, is extracted from the multimedia file. For instance, a query for "Helen" initiates a search for every n characters, where n=2, "He," "Hele," and "Helen." Accordingly, the user is presented with a dynamic result set that is reduced to include the multimedia files having multimedia metadata that match the strings entered in the query input field. In operation, when the user utilizes the query input field, the multimedia database performs a prefix match against all the words in the word object. The words in the word object are then referenced back through the word association object to either the label or multimedia objects that contains the word. If the query results in a label object, the label association object is traversed to determine the list of multimedia objects associated with the word. The lists retrieved from the word association and label association objects are combined to generate a complete list of multimedia objects that contain a word that begins with a subset of the letters that the user enters in the query input field. In an embodiment of the invention, multimedia objects that are in both lists have one entry in the combined list.

Figure 4:
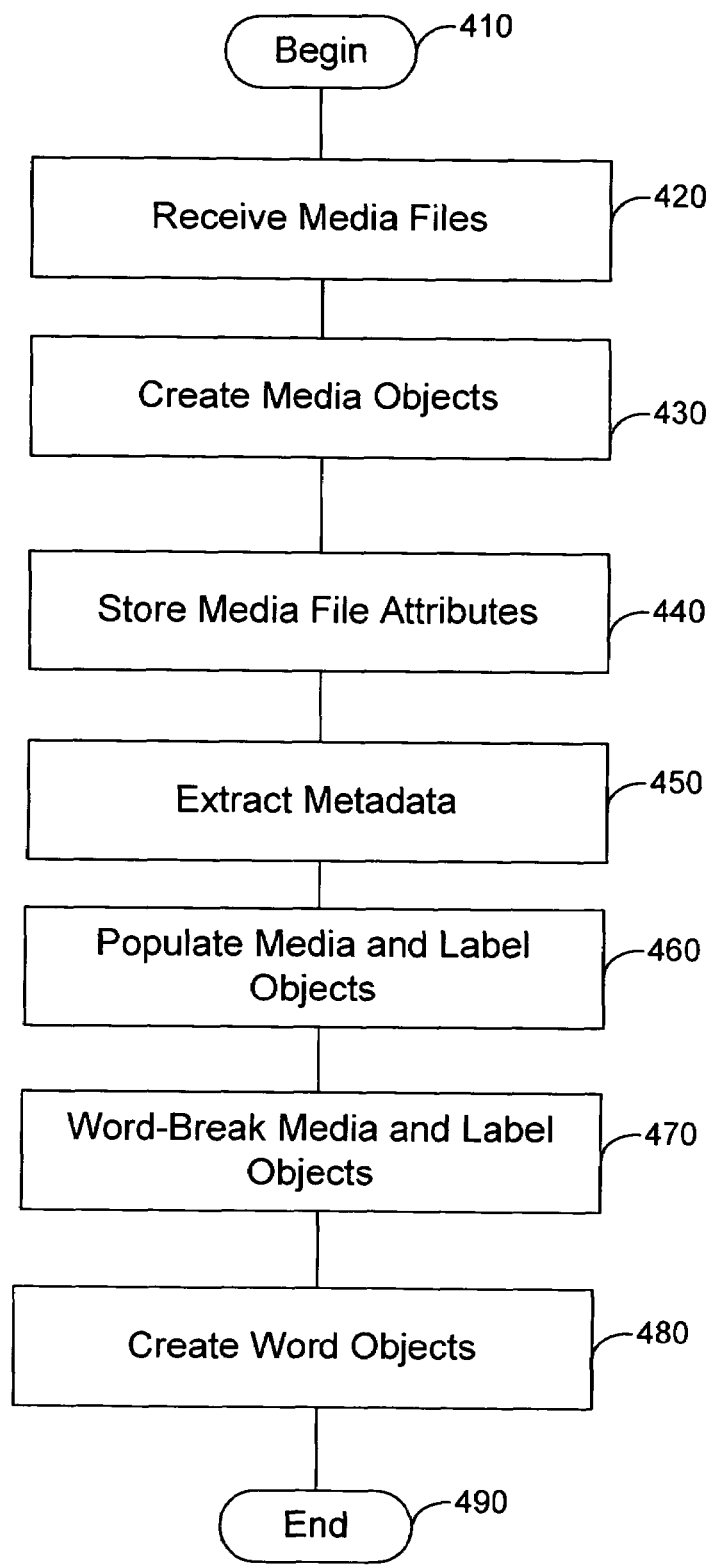
FIG. 4 illustrates a flow diagram of a method to generate the multimedia database utilized by embodiments of the invention.

The multimedia database includes multimedia objects and label objects. The multimedia files in the file system provide the multimedia metadata that populates the multimedia and label objects. The word objects are created utilizing the information stored in the multimedia and label objects. The multimedia database utilizes the multimedia, label and word objects to generate responses to user queries. FIG. 4 illustrates a flow diagram of a method to generate the multimedia database utilized by embodiments of the invention. The method begins in step 410. In step 420 the multimedia files are received from the file system. The multimedia database creates one or more multimedia objects that correspond to the multimedia files in step 430. The multimedia objects store multimedia file attributes that are associated with the file system in step 440. The fast multimedia metadata is extracted in step 450. The multimedia and label objects are populated with the fast multimedia metadata in step 460. The multimedia and label objects are processed by the natural language word breaker in step 470 and word objects are created in step 480. The method ends in step 490.

The multimedia database maintains an up-to-date reflection of the multimedia metadata associated with the multimedia files and the user may utilize the word objects to retrieve the multimedia files. The multimedia database caches the result set associated with the queries issued by the users. The multimedia database is monitored to detect changes in the multimedia metadata associated with the multimedia files. When a change is detected, the cached results can be modified to reflect the changes in the multimedia metadata. The multimedia objects associated with the multimedia files are updated to reflect the changes to the multimedia files. Moreover, when the multimedia metadata changes, a policy is applied to determine which attributes associated with the label or word objects should be updated to reflect the change. The identifiers associated with the word and label objects are retrieved and the label and word association objects, which are stored in the cache are updated to reflect the change in the multimedia metadata. Accordingly, the label association and word association objects are updated on the fly based on the on the identifiers associated with the word and label objects, without having to invalidate the cached result set.

Figure 5:
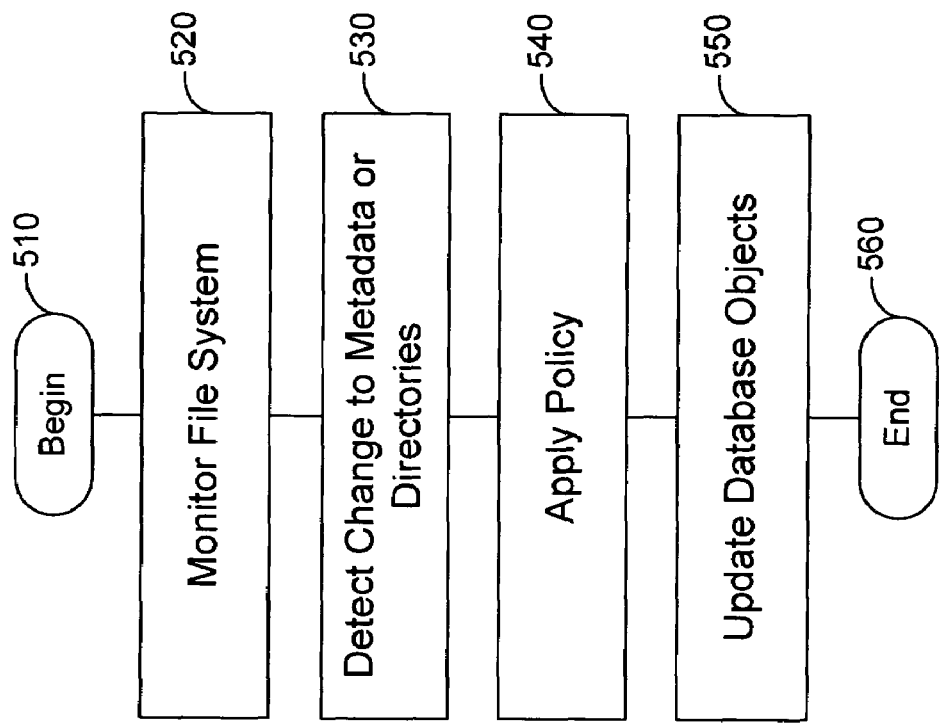
FIG. 5 illustrates a flow diagram of a method to monitor the multimedia database.

FIG. 5 illustrates a flow diagram of a method to monitor the multimedia database. The method begins in step 510. The multimedia database monitors the file system in step 520. The multimedia database detects changes in the metadata or directories in step 530. The policies associated with multimedia file are applied in step 540, and the word label and media objects are updated to reflect the changes in step 550. Moreover, the word and label association objects are also updated to reflect the changes. The method ends in step 560.

In addition to the prefix query, a user may perform label queries and complex queries that represent a union or intersection of the prefix query and the label queries. When a user performs a prefix query, the multimedia database takes snapshots of the text as the user enters the query and issues multiple queries representing the user query at different moments while the user enters the query. Accordingly the user query for "true" would may issue multiple queries having a sequence, such as, "t," "tr," "tru" and "true." The multimedia database responds with a dynamic result set that includes all multimedia files having multimedia metadata that includes strings that match the multiple queries issued by the prefix query. The multimedia database utilizes the word objects and word association objects to retrieve the multimedia files that match the query. Moreover, the user may issue label queries based on values stored in the label hierarchies. The multimedia database utilizes the label object and label association objects to return all multimedia files that match the label queries. The user may issue complex label queries that represent the union or intersection of queries on different labels represented in the label and label association objects. For instance, the user may issue a label query to find all multimedia files having a rating of four or five. This query would issue two queries the first for a rating of five the second for a rating of four. The result set for each query is combined via a union. Also, label queries on hierarchical labels may generate implicit queries. For instance, a family label may have children labels mom and dad. A label query utilizing the family label generates a label query on family and performs implicit queries on the children labels, mom and dad. The multimedia database uses the label object to determine which labels have children and performs additional queries when necessary. In an embodiment of the invention, the label queries are issued when a user selects a node of a label tree representing the multimedia metadata associated with the multimedia files, and the prefix queries may be issued on the result set generated by the label query to further refine the result set.

Figure 6:
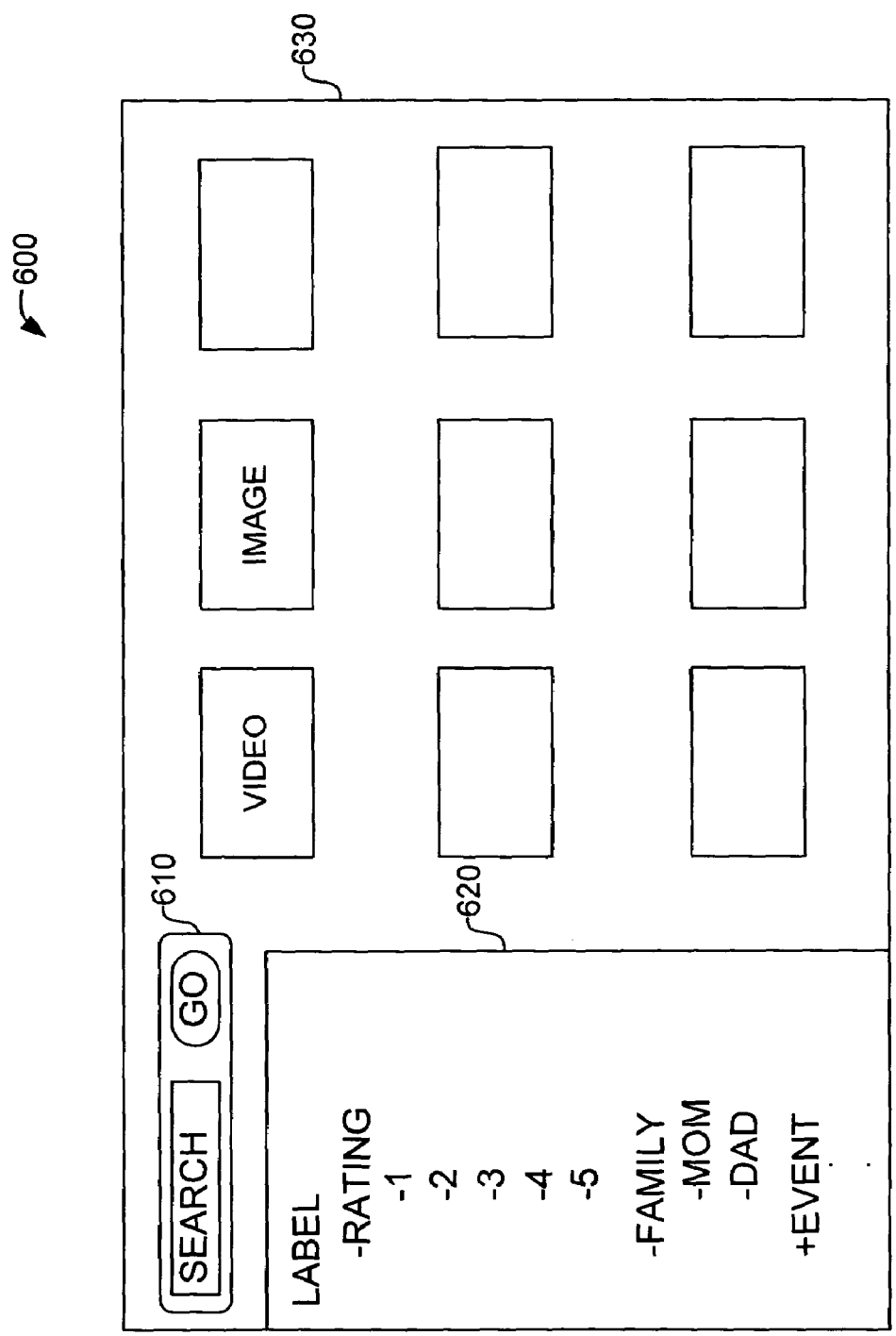
FIG. 6 illustrates a graphical user interface where a user may perform retrieval operations on the multimedia database.

FIG. 6 illustrates a graphical user interface 600 where a user can perform retrieval operations on the multimedia database. The graphical user interface includes a view 630, a query input field 610 and a label tree 620. The query input field 610 allows the user to input string queries to search the metadata stored in the multimedia database. The view 630 provides a thumbnail display for the multimedia files that match the user query. A user may utilize the label tree 620 to issue hierarchical queries on the multimedia database. Here, a label query on the family node of the label tree 620 issues a query for the child nodes, mom and dad and the union of the queries is returned to the user. Moreover, a user may issue a label query and a word query, so that the result set displayed in the view 630 is further reduced based on the query issued by the user.

In an embodiment of the invention, a prefix query may generate a label query. For instance a user that issues a prefix query on the letter "F," receives all multimedia files having multimedia metadata that match the prefix query. The prefix query also initiates a label query because the word and word association objects determines that the family label satisfies the prefix query. So, the label and the label association objects are utilized to respond to the hierarchical label query by utilizing the family node. In an alternative embodiment of the invention, the user may issue Structured Query Language (SQL) queries to retrieve multimedia files based on criteria specified in the SQL queries. Additionally, in an alternate embodiment of the invention, the query input field includes a correction feature that corrects misspelled words entered by the user. The user may chose to accept or reject the automatic corrections presented by the multimedia database.

In sum, a global search may be performed across metadata associated with the multimedia files to generate result sets that match user requests. The multimedia files are represented by multimedia objects that maintain an accurate reflection of the audio, photo, video, and video clips and their related multimedia metadata stored within monitored directories or sub-directories of the file system. Heavy processing operations related to extracting slow multimedia metadata is hidden from users of the multimedia database. The multimedia database is optimized for extracting relevant multimedia metadata from the multimedia files. The multimedia database utilizes a set of objects to represent the multimedia metadata and the multimedia files. The set of objects track the mappings of individual words to the multimedia files. The mappings are persisted in the multimedia database across different query sessions, which provide large processing savings because the multimedia metadata having text strings is reprocessed only when the text changes, as opposed to whenever someone runs a text search.

Alternate embodiments of the invention, provide a method to utilize optimized objects to generate dynamic result sets. When multimedia metadata is static across a set of multimedia files, a label object is created to represent the multimedia metadata and the collection of multimedia files. The multimedia metadata that is not static is stored in a multimedia object, and a word object is created to provide access to the multimedia objects that contain strings in the multimedia metadata. Each word object includes a unique word and references to a set of multimedia objects that are associated to the unique word. A prefix query and label query utilize the word object and label objects to generate result sets that are combined to represent a dynamic set of multimedia files that satisfies the prefix and label queries.

The foregoing descriptions of the invention are illustrative, and modifications in configuration and implementation will occur to persons skilled in the art. For instance, while the present invention has generally been described with relation to FIGS. 1-6, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. One or more computer-storage media having computer-executable instructions embodied thereon that, when executed, perform a method for generating a multimedia database, the method comprising:
   receiving multimedia files;
   extracting file system data from the multimedia files;
   creating multimedia objects to store the file system data;
   applying metadata policies to the multimedia files to obtain fast metadata, wherein applying metadata policies comprises:
   accessing multimedia metadata within the multimedia files; and
   prioritizing the multimedia metadata into the fast metadata and slow metadata, wherein the fast metadata is extracted from the multimedia files before the slow metadata is extracted, and wherein extracting the fast metadata does not require processor-intensive operations; and
   storing the fast metadata in the multimedia objects.

2. The computer-storage media according to claim 1, further comprising:
   shredding the multimedia objects to populate label objects and label association objects.

3. The computer-storage media according to claim 2, further comprising:
   breaking the multimedia objects and the label objects to populate word objects and word association objects.

4. The computer-storage media according to claim 3, wherein breaking the multimedia objects and the label objects further comprises:
   performing natural language analysis on the multimedia and label objects.

5. The computer-storage media according to claim 1, wherein each multimedia object stores a flag to represent a state of the multimedia object.

6. The computer-storage media according to claim 5, wherein multimedia database notifications are generated depending on the flag.

7. A computer- storage media according to claim 1, further comprising a memory component configured to store the computer-storage media and a processor component configured to execute the method as recited in claim 1.

8. The computer-storage media according to claim 1, wherein the fast metadata includes multimedia metadata that is determined from the multimedia database, and wherein the slow metadata comprises multimedia metadata that is extracted upon processing the multimedia file utilizing one or more mathematical models.

9. One or more computer-storage media having computer-executable instructions embodied thereon that are configured for storing a data structure for a multimedia database, the data structure comprising:
   at least one multimedia object to store information about one or more monitored file types;
   at least one label object to represent metadata associated with the multimedia objects, wherein the metadata is static over a large set of multimedia objects and is persistently stored in one or more hierarchical relationships that are configured to maintain children nodes in association with the at least one multimedia object; and
   at least one word object to index the at least one multimedia object and the at least one label objects based on a prefix, wherein the prefix utilized to index the at least one multimedia object and the at least one label object by the at least one word object is derived from breaking metadata having strings into unique words that are mapped to a respective multimedia object.

10. The computer-storage media according to claim 9, further comprising:
    at least one label association object to store references that map the label object and multimedia object.

11. The computer-storage media according to claim 9, further comprising:
    at least one word association object to store references that map at least one word object to at least one label object or multimedia object.

12. The computer-storage media according to claim 9, further comprising:
    at least one status object to store state data representing a state of at least one multimedia object.

13. The computer-storage media according to claim 9, wherein at least one thread monitors the multimedia database for changes.

14. The computer-storage media according to claim 9, wherein the label object stores metadata that is static across a large set of multimedia objects, and wherein each of the multimedia objects in the set are associated with a distinct file.

15. A computerized method for monitoring a multimedia database, the method comprising:

interrogating one or more files having a predetermined file extension;
creating multimedia objects to represent the one or more files;
receiving a query from a user;
incident to receiving the query, generating a result set of identified files associated with the query by applying the query to the multimedia objects, wherein the identified files are selected from the one or more files;
updating metadata associated with the one or more files; and
at least temporarily storing the multimedia object associated with the identified files with a flag appended thereto to inform a background thread that the result set should be automatically updated.

16. The computerized method according to claim 15, further comprising:
assigning priorities to metadata associated with the multimedia object.

17. The computerized method according to claim 15, wherein creating multimedia objects to represent the one or more files further comprises:
applying a policy dependent on the file extension of the one or more files.

18. The computerized method according to claim 15, wherein metadata includes fast metadata and slow metadata.

19. The computerized method according to claim 15, wherein the one or more files represent a collection of files.

* * * * *

UNITED STATES PATENT AND TRADEMARK OFFICE
CERTIFICATE OF CORRECTION

| | | |
|---|---|---|
| PATENT NO. | : 7,469,257 B2 | Page 1 of 1 |
| APPLICATION NO. | : 11/220705 | |
| DATED | : December 23, 2008 | |
| INVENTOR(S) | : David R. Parlin et al. | |

It is certified that error appears in the above-identified patent and that said Letters Patent is hereby corrected as shown below:

In column 12, line 16, in Claim 7, delete "computer- storage" and insert -- computer-storage --, therefor.

Signed and Sealed this
Third Day of May, 2011

David J. Kappos
*Director of the United States Patent and Trademark Office*